United States Patent [19]
Gassmann

[11] Patent Number: 5,690,201
[45] Date of Patent: Nov. 25, 1997

[54] METHOD AND DEVICE FOR CONTROLLING A COUPLING

[75] Inventor: Theodor Gassmann, Siegburg, Germany

[73] Assignee: GKN Viscodrive GmbH, Lohmar, Germany

[21] Appl. No.: 604,442

[22] Filed: Feb. 21, 1996

[30] Foreign Application Priority Data

Feb. 21, 1995 [DE] Germany .................. 195 05 800.3

[51] Int. Cl.$^6$ .................. F16D 43/284; B60K 23/02; B60K 23/04
[52] U.S. Cl. .................. 192/35; 180/249; 192/57; 192/58.42; 192/103 FA
[58] Field of Search .................. 192/35, 56.31, 192/57, 58.42, 103 FA, 104 F, 105 F; 180/249; 475/88, 95

[56] References Cited

U.S. PATENT DOCUMENTS

| | | |
|---|---|---|
| 2,876,881 | 3/1959 | Parrett .................. 192/57 X |
| 3,511,349 | 5/1970 | Herscovici .................. 192/56.31 |
| 4,012,968 | 3/1977 | Kelbel . |
| 4,058,027 | 11/1977 | Webb . |
| 4,224,838 | 9/1980 | Roushdy et al. . |
| 4,683,997 | 8/1987 | Stockmar et al. .................. 192/58.42 |
| 4,836,051 | 6/1989 | Guimbretiere . |
| 4,842,115 | 6/1989 | Ohzono et al. .................. 192/103 FA X |
| 4,905,808 | 3/1990 | Tomita et al. . |
| 4,966,268 | 10/1990 | Asano et al. . |
| 4,982,808 | 1/1991 | Taureg et al. . |
| 5,007,515 | 4/1991 | Shimizu . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. . |
| 5,197,583 | 3/1993 | Sakai et al. . |
| 5,259,488 | 11/1993 | Oberdorster et al. . |
| 5,261,861 | 11/1993 | Pierce . |
| 5,267,916 | 12/1993 | Beim et al. . |
| 5,405,293 | 4/1995 | Severinsson .................. 192/35 X |
| 5,526,912 | 6/1996 | Gassmann .................. 192/58.42 X |
| 5,536,215 | 7/1996 | Shaffer et al. .................. 475/88 |

FOREIGN PATENT DOCUMENTS

| | | |
|---|---|---|
| 0247008 | 5/1987 | European Pat. Off. . |
| 0347165 | 12/1989 | European Pat. Off. . |

(List continued on next page.)

*Primary Examiner*—Rodney H. Bonck
*Attorney, Agent, or Firm*—Dinnin & Dunn, P.C.

[57] ABSTRACT

A coupling for transmitting torque between two parts (14, 20; 16, 24) which are rotatable relative to one another, comprising a friction coupling (12) whose friction elements (15, 17) are each non-rotatably connected to the one and the other of the parts (14, 20; 16, 24) which are rotatable relative to one another, with the friction coupling (12) being loadable by at least one movable piston (19) which, at one end, delimits a pressure chamber (21) which is filled with a viscous fluid, which is connected to a reservoir (26), whose rotational housing (20) is formed by the one of the rotatable parts (14, 20) and by the piston (19) sealed relative thereto and in which there rotates a rotational member (22) connected to the other one of the rotatable parts (16, 24), with rotational faces of the rotational member (22), together with counter faces of a pumping and control member (23) positioned in the pressure chamber (21) constituting at least one sealed shear channel (38) which, in the respective direction of relative rotation, communicates with the reservoir (26) at the front end and which, in the respective direction of relative rotation communicates with the pressure chamber (21) at the rear end, and with a bypass pipeline (91) being provided so as to extend parallel to the shear channel for connecting the pressure chamber (21) with the reservoir (26), in which pipeline there is arranged a pressure relief valve (92) which opens from the pressure chamber (21) to the reservoir (26) and which serves to limit the pressure in the pressure chamber.

22 Claims, 11 Drawing Sheets

FOREIGN PATENT DOCUMENTS

| | | |
|---|---|---|
| 480175 | 4/1992 | European Pat. Off. . |
| 0549828 | 7/1993 | European Pat. Off. . |
| 0639730 | 2/1995 | European Pat. Off. . |
| 938813 | 7/1949 | Germany . |
| 4103054 | 8/1991 | Germany . |
| 4032245 | 3/1992 | Germany . |
| 64-87928 | 4/1989 | Japan . |
| 1-126440 | 5/1989 | Japan . |
| 1-220728 | 9/1989 | Japan . |
| 251626 | 2/1990 | Japan . |
| 2120529 | 5/1990 | Japan . |
| 2120530 | 5/1990 | Japan . |
| 369829 | 3/1991 | Japan . |
| 2202602 | 9/1988 | United Kingdom . |
| 2222232 | 2/1990 | United Kingdom . |

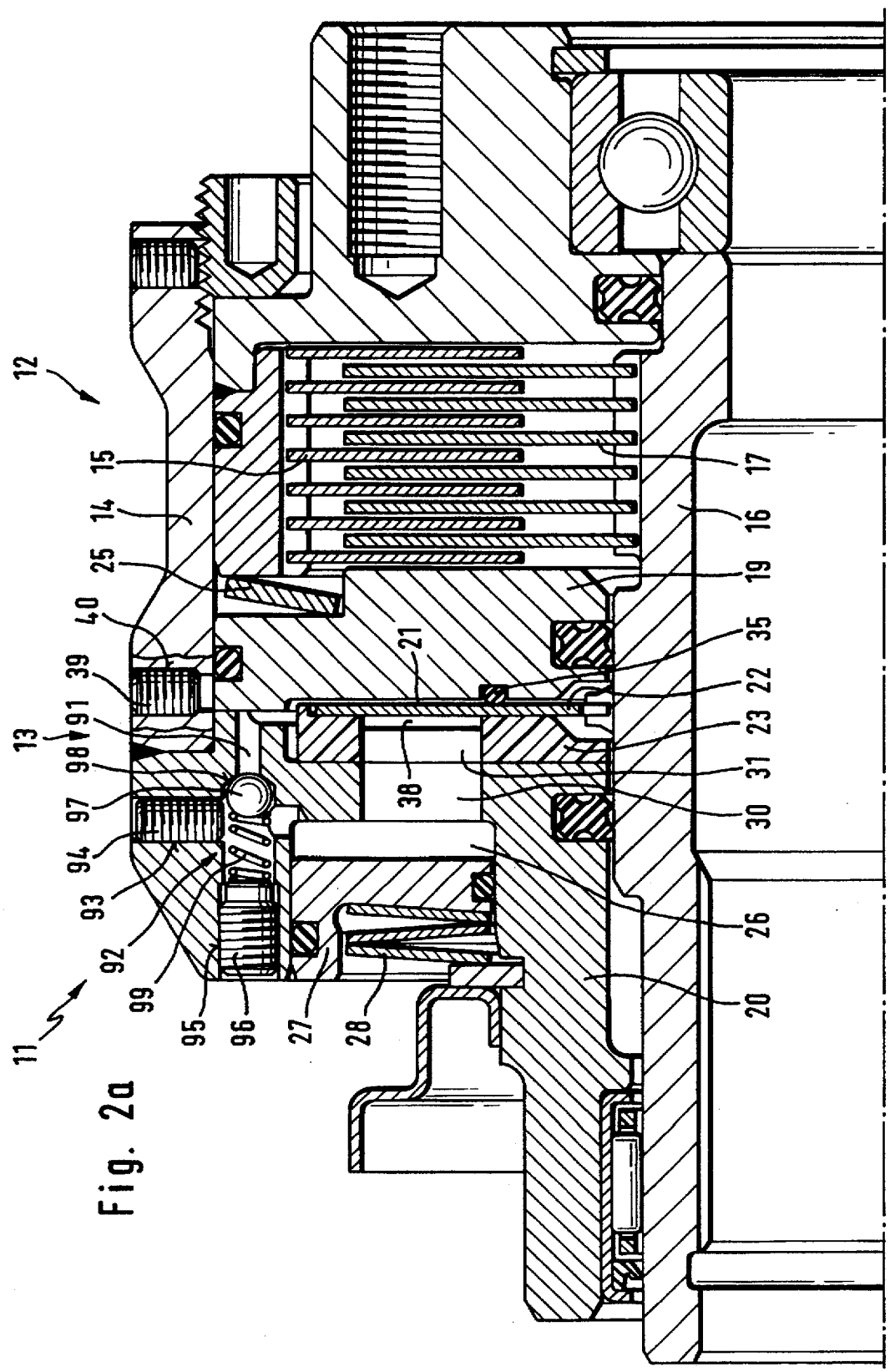

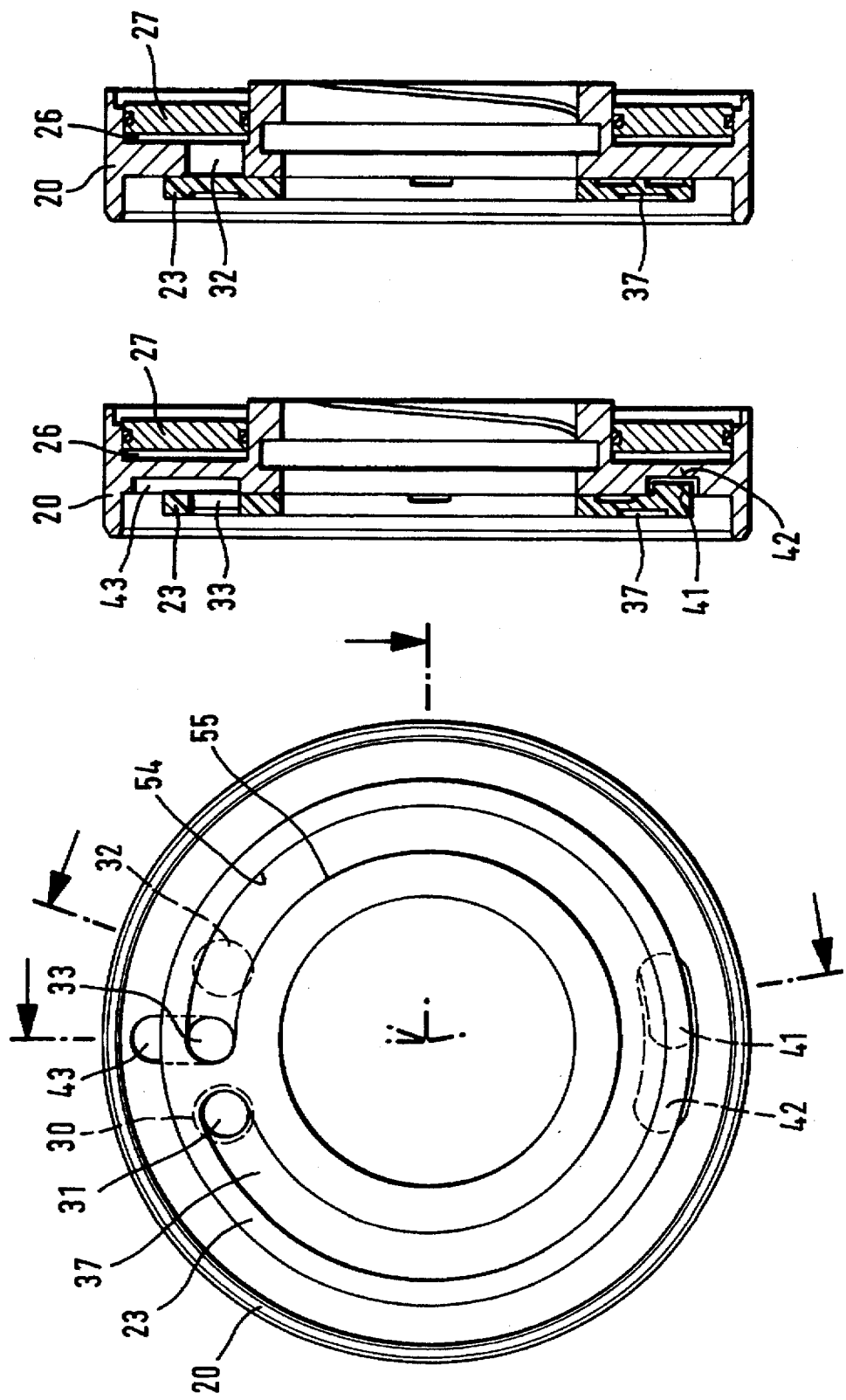

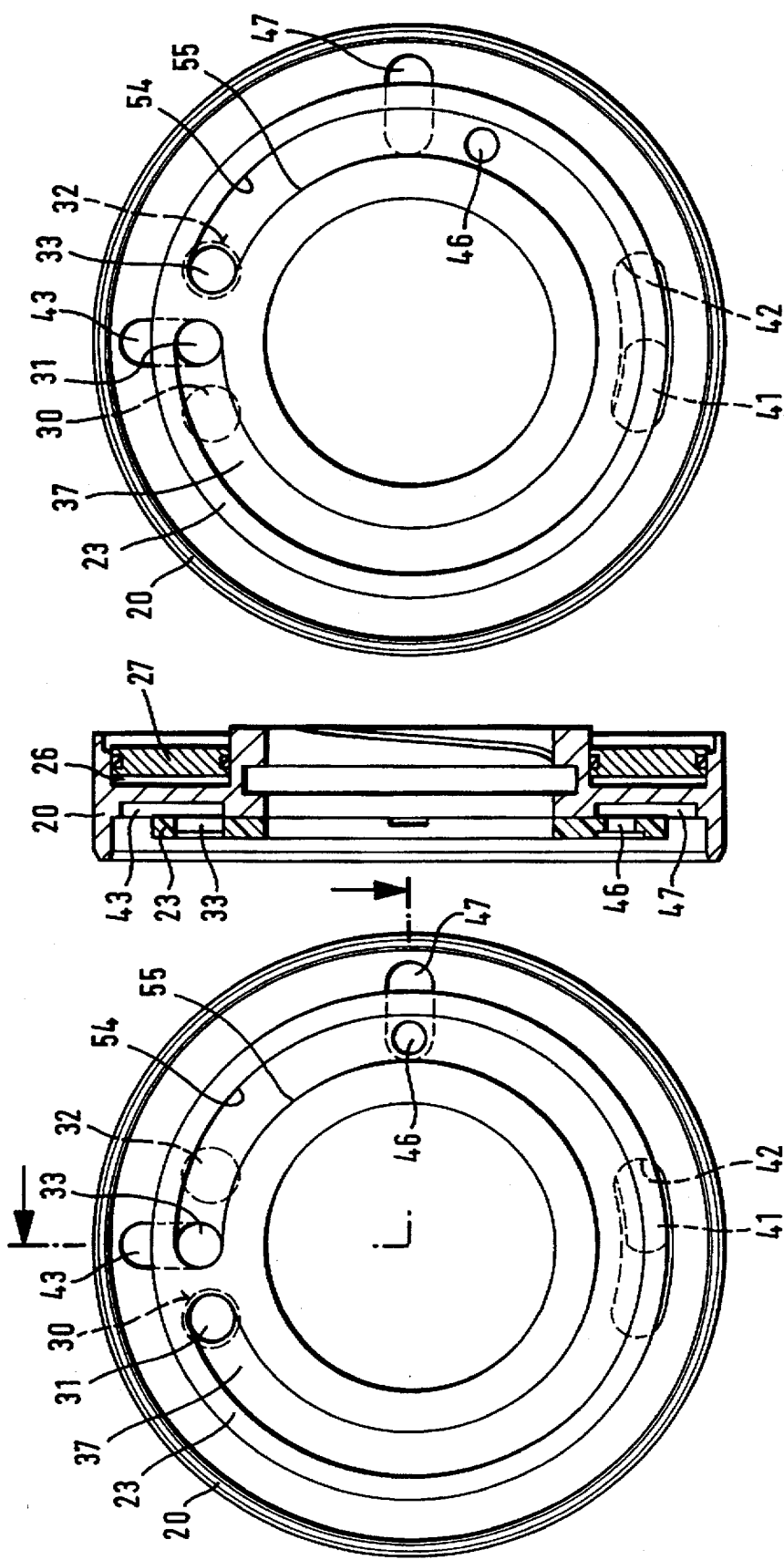

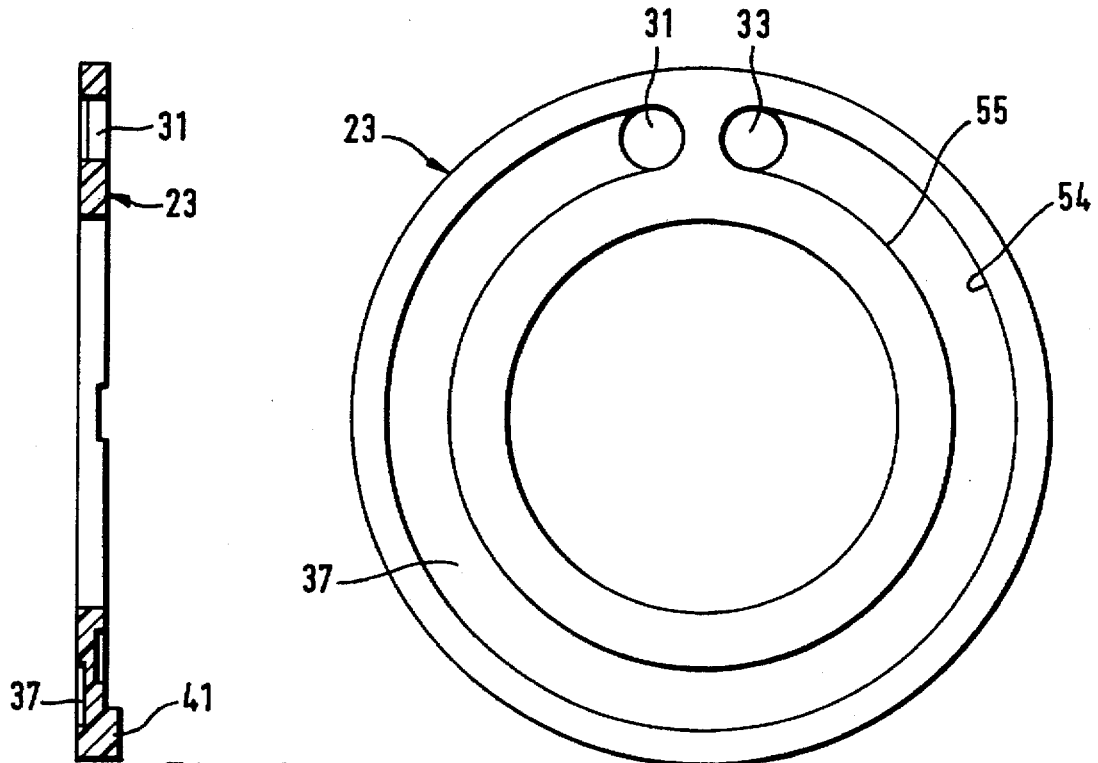
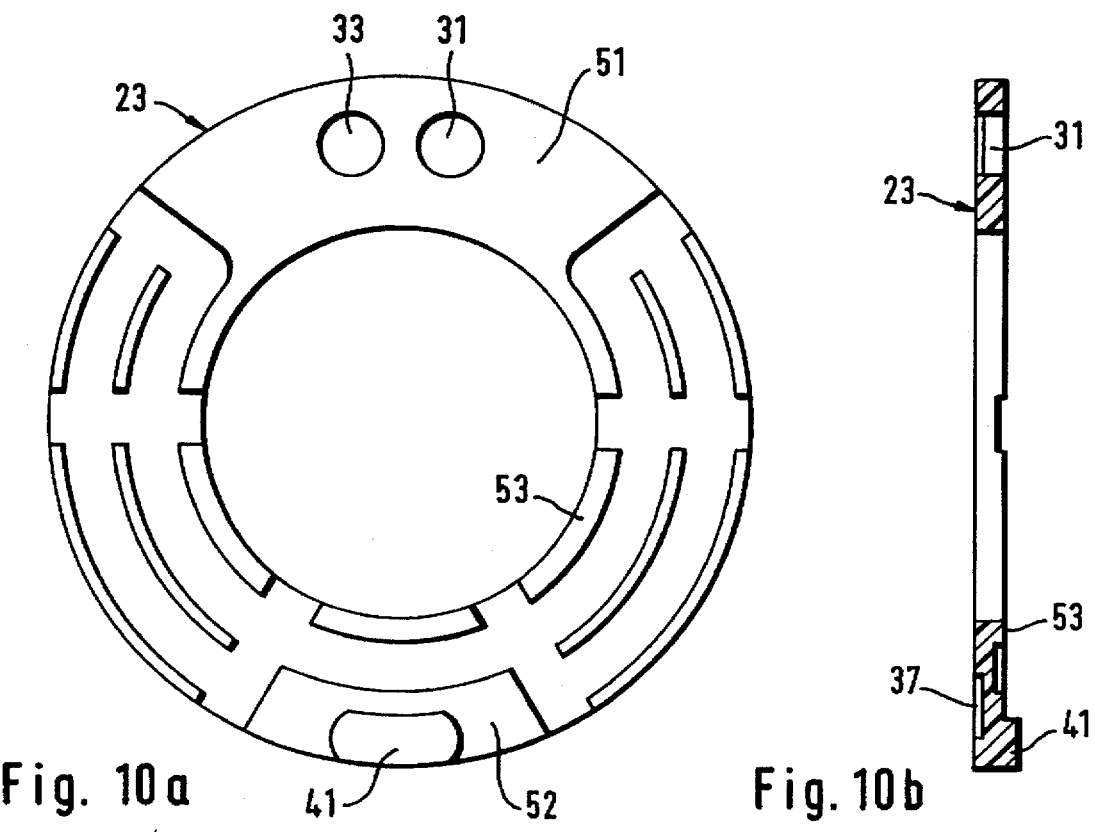

METHOD AND DEVICE FOR CONTROLLING A COUPLING

BACKGROUND OF THE INVENTION

The invention relates to a coupling for transmitting torque between two parts which are rotatable relative to one another, comprising a friction coupling whose friction elements are each non-rotatably connected to the one and the other of the parts which are rotatable relative to one another, with the friction coupling being loadable by at least one movable piston which, at one end, delimits a pressure chamber which is filled with a viscous fluid, which is connected to a reservoir whose rotational housing is formed by the one of the rotatable parts and by the piston sealed relative thereto and in which there rotates a rotational member connected to the other one of the rotatable parts. The viscous fluid is meant to be a high-viscosity fluid such as it is commonly used in viscous couplings.

A method and coupling of this type are known from U.S. Pat. No. 4,905,808 wherein a disc which is star-shaped in an axial view rotates in a chamber filled with a viscous fluid if there exists a speed differential between the rotatable parts. Because of a behavior of the fluid, a dynamic pressure builds up between the disc and the chamber housing and acts on a piston which delimits the chamber and serves to actuate the friction coupling. The possibilities of varying the characteristics of said coupling as a function of the differential speed are very limited; basically, only the filling level and the viscosity of the viscous fluid can be freely selected. A further disadvantage consists in the low pressure level achievable and the resulting low performance density.

A first application refers to a differential drive to be used in drivelines of motor vehicles, having a differential carrier to be supported in a differential drive housing, having first and second output gears arranged coaxially relative to one another and at least two differential gears, and having a friction coupling whose first friction elements are held non-rotatably in the differential carrier. In the same way, the invention relates to differential gears of said type, having a friction coupling whose first friction elements are arranged non-rotatably relative to the first of the axle shaft gears and whose second friction elements are arranged non-rotatably relative to the second of the axle shaft gears.

Differential gears of said type are known from U.S. Pat. No. 4,012,968 with the actuating device for the friction coupling comprising a displacement pump.

Assemblies of said type are used in the drivelines of motor vehicles and land machinery for generating a locking moment as a function of the speed differential, between two parts rotating relative to one another.

The coupling is preferably used in a motor vehicle with a permanently driven axle and an axle driven from case to case, with the coupling being arranged directly in a driveline associated with the latter axle. As a result, when there occurs a speed differential between the associated axle and the permanently driven axle, the respective driveline is torque-loaded due to the effect of the coupling, whereas the coupling ensures that the driveline remains torque-free if the axles rotate at identical speeds, with the respective axle following in a torque-free way.

Depending on the adhesion conditions at the permanently driven axle, it is thus possible to vary the torque distribution between the two axles between 100%: 0 and 0: 100%, i.e. from "the entire torque at the permanently driven axle" to "the entire torque at the axle driven from case to case only." In consequence, the driveline pan leading to the latter axle also has to be designed to accommodate maximum torque.

The operating conditions under which the permanently driven axle cannot accommodate any torque at all, i.e., under which the driven wheels spin freely, are rare in the complete load spectrum, i.e., the operating conditions considered are those under which, as a rule, the maximum torque is not required. There therefore seems no need to include the capability of accommodating maximum torque.

It is therefore the object of the invention to provide a simply designed differential speed sensing coupling with a high performance density and widely selectable characteristics, which acts as a torque limiting device.

The objective is achieved by means of a coupling which is characterized in that rotational faces of the rotational member, together with counter faces of a pumping and control member positioned in the pressure chamber, constitute at least one sealed shear channel which is formed by a groove laterally delimited by walls and extending circumferentially between two ends and by a surface which covers the groove and is rotatable relative thereto; that the pumping and control member is rotatable to a limited extent between two end positions relative to the rotational housing; that the groove, by means of control apertures in the pumping and control member which are arranged at the groove ends, is connected to the reservoir in the rotational housing and to the pressure chamber between the piston and the rotational member in such a way that in the two end positions of the pumping and control member, the control apertures arranged at the respective front end of the groove in the direction of relative rotation communicates with the reservoir and that the control aperture arranged at the respective rear end of the groove in the direction of relative rotation communicates with the pressure chamber; and that there is provided a pipeline for connecting the pressure chamber to the reservoir, in which pipeline there is arranged a valve which opens from the pressure chamber to the reservoir and which is provided to limit the pressure in the pressure chamber.

When the rotatable parts of the coupling rotate relative to one another, a pressure axially loading the friction plates of the friction coupling builds up in the pressure chamber. However, by means of the valve in the channel between the pressure chamber and reservoir, the pressure to be built up has to be limited to a maximum value in such a way that the friction coupling is not closed completely, but that as the axial force which is generated by the pressure in the pressure chamber and applied to the piston is limited to a maximum value, the torque which the friction coupling is capable of transmitting is limited accordingly.

When the coupling is incorporated into a driveline leading to a second driving vehicle axle which is torque loaded only when necessary, the torque transmittable to said second axle has to be limited to said maximum value so that said driveline part does not have to be designed to accommodate the full engine torque. Regardless of the above, it is possible, in this way, if slip occurs at the permanently driven axle, to achieve four wheel drive conditions for the vehicle, which, especially, permit starting in the case of greatly differing friction values between the wheels of the two axles.

Various further embodiments serve to adapt the vehicle to special driving conditions, as will be explained below. According to a preferred embodiment, the valve rotates with the input end of the coupling.

According to a first embodiment, it is proposed that the valve is a pressure relief valve which comprises a pretensioned spring and a valve body held thereby against a valve seat. The coupling thus has an automatic control function in the above-described sense. When a certain pressure is reached, which is primarily built up as a direct function of the differential speed, the coupling is opened.

According to a first modification, the valve body is arranged in the coupling so as to be movable in an axis-parallel way against the force of the spring, so that, upon rotation of the coupling, the centrifugal force acting on the valve body does not affect the contact force applied by the valve body to the valve seat. The above-mentioned function is substantially unaffected by the absolute number of revolutions or driving speed and is maintained under any circumstances.

In this way it is easily possible to ensure that the torque transmittable by the coupling for a high vehicle speed—which corresponds to a high rotational speed of the input end of the coupling—can be limited or eliminated. It is a well-known fact that an abrupt change from two-wheel drive to four wheel drive at high speeds can cause unstable driving conditions. Such an abrupt connection of the axle driven only when needed can occur when the vehicle drives over a sheet of ice. The above-described means dampen the engagement of the coupling. In extreme cases it is also possible for the pressure relief valve, at an increased speed, to open the bypass, even independently of a prepressure in the pressure chamber, in which case the effect of the coupling on high vehicle speeds is eliminated completely.

In the case of a standard pressure relief valve design having a ball which is positioned on a valve seat and pressed on by a helical spring, the desired influence on speed is achieved if the ball is in an eccentric position, with the valve bore and helical spring axis respectively extending radially relative to the rotational axis. Whereas the dependence of the pressure relief spring on pressure may be determined by the spring design, it is possible, independently thereof, to vary the centrifugal force characteristics by the ball mass and the arrangement of the ball relative to the rotational axis. Instead of using the ball, it is possible to use any other valve body analogously.

In yet another modification, it is proposed that the valve body is arranged in the coupling so as to be movable radially outwardly against the force of the spring, so that, upon rotation of the coupling, the centrifugal force acting on the valve body reduces the contact force applied by the valve body to the valve seat. Instead of the mechanical means used for converting the speed, i.e., by means of the centrifugal force, it is possible in this case, to use electric or electro-hydraulic or pneumatic means which are controlled by a standard speed transmitter. With this type of control it is also possible to consider other operating parameters. In a preferred embodiment in the case of this type of design it is proposed that the valve body is a slide which is adjustable in the coupling in an axis-parallel way.

According to the preferred further embodiment, the friction coupling is provided with spring sensing means which control means at the valve in the sense of opening them when a permissible maximum temperature is exceeded or that the friction coupling is provided with temperature sensing means which, when a permissible maximum temperature is exceeded, control the valve in the sense of opening it, the valve being arranged in the pipeline for connecting the pressure chamber to the reservoir. It is assumed that the operating conditions under which slip occurs at the permanently driven axle are of a short-term nature only, so that the coupling in accordance with the invention transmits torque only to the axle driven from case to case. The function of the valve ensures that there exists permanent slip at the friction coupling, so that the temperature of the friction coupling will increase. If this operating condition is maintained for in inordinately long time, for instance when the vehicle stalls, this would lead to a destruction of the friction coupling.

The above-mentioned means ensure that at excessively high coupling plate temperatures, the function of the coupling is eliminated until a natural cooling process causes it to resume its function. The temperature sensing means may be integrated into the control elements in such a way that an increase in temperature, by affecting expansion elements, directly causes the valve to be switched mechanically. However, the valve is preferably provided in the form of an electrically switchable valve which is electrically controlled by a temperature sensor.

The function of the control device is based on an operating principle referred to as pressure drag flow which, in turn, is based on the shear effect of a viscous medium between two plates moved relative to one another. With such a relative movement, pan of the medium, in each case with reference to one of the plates, is conveyed towards the movement of the other one of the plates. If a gap between two plates is closed at its sides to form a shear groove extending substantially parallel to the direction of relative movement, delimited at two ends and covered by a surface movable in the direction of the groove, there is produced a shear channel which, as a function of the magnitude and direction of the relative movement, conveys fluid from the one end of the shear channel produced in this way, to the other end. The conveying pressure is directly proportional to the length of the shear channel, to the viscosity of the sheared medium and to the shear rate, i.e., the relative speed. If said shear channel is arranged accordingly, i.e. in such a way that it connects two chambers to one another and that the two parts forming the shear channel are connected to the one and the other of the rotating pans of a coupling, there is generated a differential-speed-dependent conveying pressure which can be utilized in that the pressure in a pressure chamber is increased, which pressure acts on at least one piston which loads the friction elements of a friction coupling. In accordance with the method proposed by the invention, then at least one shear channel, by being re-controlled, is used to generate pressure, independently of the direction of relative rotation of the parts relative to one another. It has been found to be advantageous to propose that, at the time of re-controlling, the shear channel end previously used for removing pressure is directly connected to the reservoir, so that the decrease in pressure at this end does not have to take place along the entire length of the shear channel.

To achieve assembly characteristics which differ as a function of the direction of rotation, it is proposed in a further preferred embodiment that, in one of the two directions of relative rotation of the parts, only part of the length of the shear channel is used to build up pressure in that there is provided an additional connection from the reservior to the shear channel between the ends of same, which connection is free in only one direction of relative rotation and which is closed in the other direction of relative rotation. This partial length of the shear channel may, optionally, approach zero.

To achieve assembly characteristics which differ as a function of the direction of rotation, it may be proposed in a similar preferred embodiment that, in one of the two directions of relative rotation, there is additionally produced a direct connection between a portion positioned between the ends of the shear channel and the pressure chamber in order to shorten the effective channel length for the pressure build-up, which is closed in the opposed direction of relative rotation.

In principle, it is possible for the surfaces of the pumping and control member and the counter faces of the rotational member, which form the at least one shear channel, to be radially planar or conical or cylindrical, with preference being given to the shape mentioned first, with the pumping and control member and the rotational member being disc-shaped.

According to a concrete embodiment, the at least one shear channel is formed by a circumferentially extending groove in one of the rotational faces of the pumping and control member and by a counter face resting thereagainst, of the rotational member rotatable relative thereto.

It is important to provide spring means for axially pressing together the rotational member and the pumping and control member to ensure that the shear channel remains closed and to allow the pressure between the rotational member and piston to become effective.

According to the first design, it is proposed that there are provided two connecting channels between the reservoir and the pumping and control member with an angular offset of $2\alpha$ relative to one another, that, centrally therebetween, there is arranged a connecting channel leading to the pressure chamber, that the control apertures in the control member extend at an angular offset of $\alpha$ relative to one another, that the control member is rotatable by the angle $\alpha$ and that the groove extends at an angle of $(360°-\alpha)$.

In the above-mentioned case, re-controlling requires only a small rotational angle $\alpha$ of the pumping and control member.

Alternatively it is proposed that there is provided a connecting channel between the reservoir and pumping and control member, that symmetrically thereto, there are arranged two connecting channels leading to the pressure chamber, each extending at an angular offset of $2\alpha$ relative to the former connecting channel, that the control member is ramble by the angle $(360°-\alpha)$ and that the groove extends at an angle of $(360°-\alpha)$.

In the above case, the locking effect upon reversal of the direction of relative rotation is more gentle due to a delay in time.

According to a second alternative, it is proposed that there is provided a connecting channel between the reservoir and pumping and control member, that, symmetrically thereto, there are arranged two connecting channels leading to the pressure chamber, each extending at an angular offset $\alpha$ relative to the former connecting channel, that the control member is rotatable by the angle $\alpha$ and that the groove, with its ends intersecting one another, extends spiral-like at an angle of $(360°-\alpha)$. The function is identical to that of the first proposal.

Furthermore, it is proposed that the control apertures at the ends of the shear groove are provided in the form of axial bores in the disc-shaped pumping and control member, which extend from the one end face which, at least in the region of the apertures, sealingly rests against an end wall of the chamber in the rotational housing—with connecting channels leading to the reservoir ending in said end wall—to the groove positioned in the opposed second end face, that said second end face sealingly rests against a radial end face, and that, in each end position, only one of the control apertures overlaps with a connecting channel.

Furthermore, as far as design is concerned, it is proposed that the connecting channel leading to the pressure chamber is provided in the form of a radial groove in an end wall of the rotational housing, which radial groove, in each of the two end positions, overlaps with one of the two control apertures at the ends of the groove.

To achieve the above-mentioned characteristics varying as a function of the direction of rotation, it is possible to provide a further control aperture in the form of an axial bore in the disc-shaped pumping and control member, which axial bore ends in the central region of the groove and which, in only one of the end positions, overlaps with an additional connecting channel leading to the reservoir.

The same purpose is served by an embodiment in which a further control aperture is provided in the form of an axial bore in the disc-shaped pumping and control member, which axial bore ends in the central region of the groove and which, in only one of the end positions, overlaps with an additional radial connecting channel leading to the pressure chamber, which channel is provided in the form of a radial groove in the rotational housing.

The above-mentioned relative rotatability of the pumping and control member is achieved in that a stop projection at the pumping and control member engages a groove in the rotational housing, whose circumferential length is limited.

Depending on the required curve of the locking torque generated by the friction coupling as a function of the differential speed, it is possible to correct the effective forces by providing spring means which are supported on the housing and load the plates at the end facing the piston or to provide spring means which are supported on the housing and load the piston at the end facing the plates or to provide spring means which are pretensioned and arranged between the piston and friction coupling and permanently load same with a minimum force.

The reservoir may be formed by the rotational housing and by an axially movable, spring-loaded piston rotating with said housing or a spring-loaded membrane or it may comprise a resilient compensating element in a chamber which forms the reservoir. The fluid contained therein may be a dilatant medium, for example, whose viscosity increases as a function of the shear rate.

BRIEF DESCRIPTION OF THE DRAWINGS

Reference is made hereby to the wording and content of the claims.

To make it easier to understand the new operating principle and explain preferred embodiments, reference will be made below to the drawings wherein

FIG. 2a is half a longitudinal section through a first embodiment of a coupling in accordance with the invention.

FIG. 5a, 5b, and 5c show is a plan view (a) and two longitudinal sections (b, c) of the pumping and control disc and the rotational member in a third position.

FIG. 7a, 7b, and 7c show a third embodiment of a pumping and control disc with a rotational member in a plan view in two positions (a, c) and in a longitudinal section (b) in the form of details.

FIG. 9a and 9b show a section (a) and a front view (b) of a pumping and control disc in the form of a detail.

FIG. 10a and 10b show a rear view (a) and a section (b) of a pumping and control member in the form of a detail.

DESCRIPTION OF THE PREFERRED EMBODIMENT(s)

Figure 1:
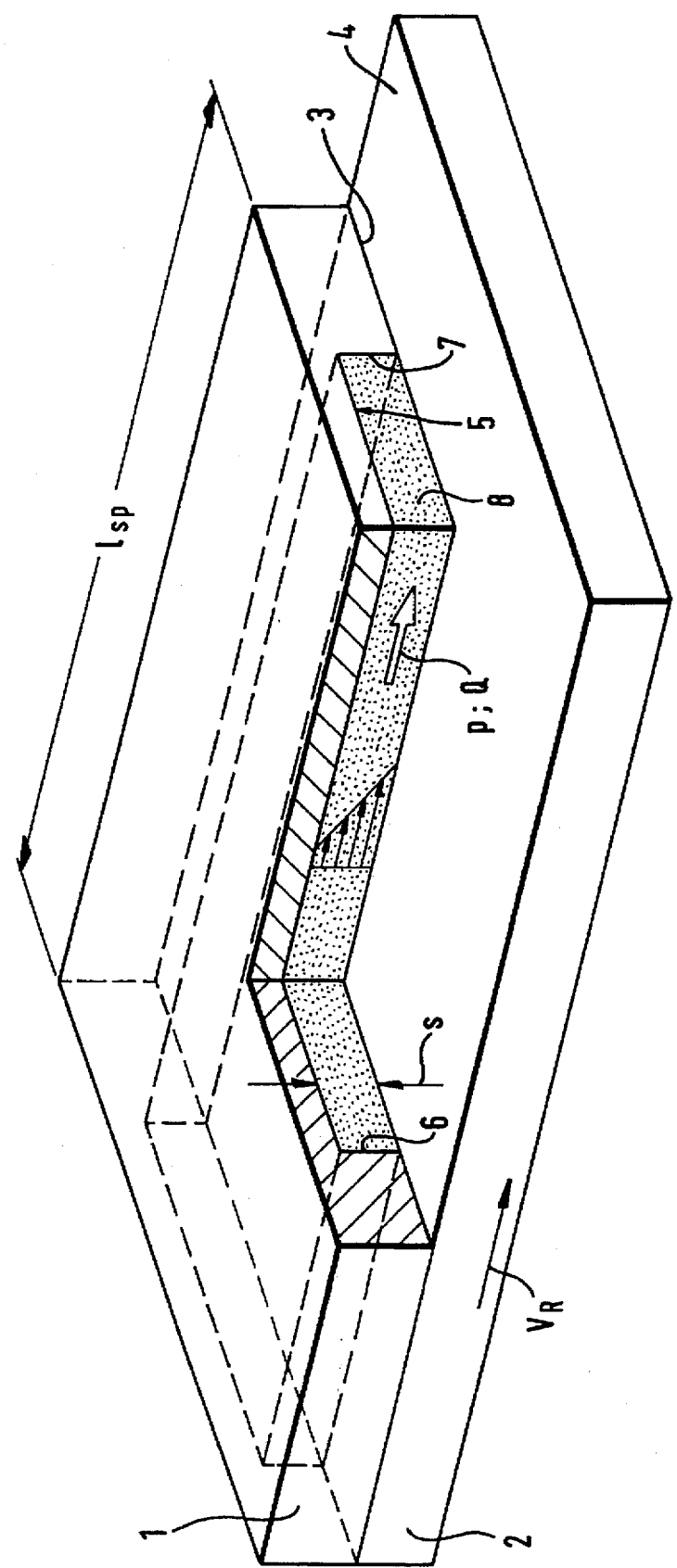
FIG. 1 is a sectionalized view of two plates which are movable relative to one another, between which plates, in one of the plates, there is provided a groove forming a shear gap.

FIG. 1 is a sectionalized view of a first plate or disc 1 and a second plate or disc 2 whose end faces 3, 4 contact one another. The first plate 1 is assumed to be fixed, with the second plate 2 moving relative thereto at the speed $V_R$. The end face 3 of the first plate 1 is provided with a groove 5 with a rectangular cross-section, with its sides being delimited by walls 6, 7. The groove 5 and end face 3 form a shear channel 8 accommodating a viscous medium. The shear channel as viewed has the length $1_{sp}$ and the height or depth s. When the plate 2 moves, the medium in the shear groove behaves as indicated by the linear speed profile which refers to the fixed plate 1. The surfaces are, of course, subject to adhesion conditions applying to both the plate 1 and plate 2. If referred to the plate 2, the speed profile would then be reciprocal. If referred to plate 1, the shear effect in the shear gap results in a pressure p and a quantity flow Q.

As the applications shown here are not based on relative linear movements but on relative rotational movements, the groove forming the shear channel preferably extends circumferentially as shown in FIGS. 2 to 12.

FIG. 2a shows a coupling assembly 11 comprising a controllable friction coupling 12 in the form of a plate coupling and a speed-sensing control assembly 13. The friction coupling comprises a housing 14 non-rotatably holding outer plates 15, and a hub 16 non-rotatably receiving inner plates 17. The friction coupling is loadable by a piston 19 which forms part of said control assembly 13 arranged in the housing 14 and comprising the axially movable piston 19 and a rotational housing 20 which rotate with the housing 14. Both form a pressure chamber 21 accommodating a disc-shaped rotational member 22 and a disc-shaped pumping and control member 23. The rotational member 22 is non-rotatably connected to the above-mentioned hub 16 which is driven. The rotational movement of the pumping and control member 23 relative to the rotational housing 20 is limited by a rotational stop (not illustrated) engaging a circumferential groove in the rotational housing 20 (not illustrated). An O-ring positioned in the piston 19 serves as spring means 35 and thus ensures close contact between the rotational member 22 and the pumping and control member 23.

When the direction of rotation of the rotational member 22 is changed by the hub 16 and toothing means, the rotational member 22 moves the pumping and control member 23 from its one end position determined by a rotational stop and circumferential groove into the other end position determined by a rotational stop and circumferential groove. The rotational housing 20, furthermore, is provided with a reservoir 26 which is delimited by an axially movable annular piston 27. The latter is supported by plate springs 28 on the housing 20 so that the reservoir 26 always has a compensating effect as regards changes in volume in the pressure chamber 21. The rotational housing 20 is shown to have an axial connecting channel 30 which, in the circumferential position as shown, overlaps with a control aperture 31 in the pumping and control member 23. The control aperture 31 is positioned at one end of the shear channel 38 formed by a circumferentially delimited groove in the pumping and control member 23 and by the surface of the rotational member 22. The parts rotating relative to one another are each sealed relative to one another by seals. The gap between the rotational member 22 and the piston 19 radially outside the O-ring 35 has to be regarded as part of the pressure chamber 21. The screw 39 in a housing bore 40 serves to fill and ventilate the pressure chamber and the reservoir. The plate springs 25 are supported on the housing 14 and act on the piston 19, generating a counter force relative to the effect of the pressure chamber.

A pipeline 91 accommodating a pressure relief valve 92 extends parallel to the connection between the reservoir 26 and pressure chamber 21, which connection is established by the housing bore 30 and the control aperture 31, by the shear channel 38 and by a further control aperture which cannot be seen in the section shown. The pressure relief valve is formed by two intersecting bores 93, 95 each closed by threaded plugs 94, 96 and by a valve ball 97 resting on fit valve seat 98 and loaded by a pressure spring 99. The control assembly functions in such a way that in the case of a relative speed between the driving hub 16 and, if applicable, the driven housing 14, pressure is built up in the pressure chamber 21 due to the effect of the shear channel 38, which pressure loads the piston 19 for actuating the friction coupling 12. As a result of the function of the pressure relief valve 91, the pressure in the pressure chamber and thus the force of the piston are limited to a permissible maximum pressure in such a way that the friction coupling, under conditions of permanent slip, transmits a permissible maximum torque only.

The bore 93 extends so as to be axis-parallel to the coupling axis so that any influence of the absolute speed of the housing 14 on the opening pressure is almost impossible.

Figure 2B:
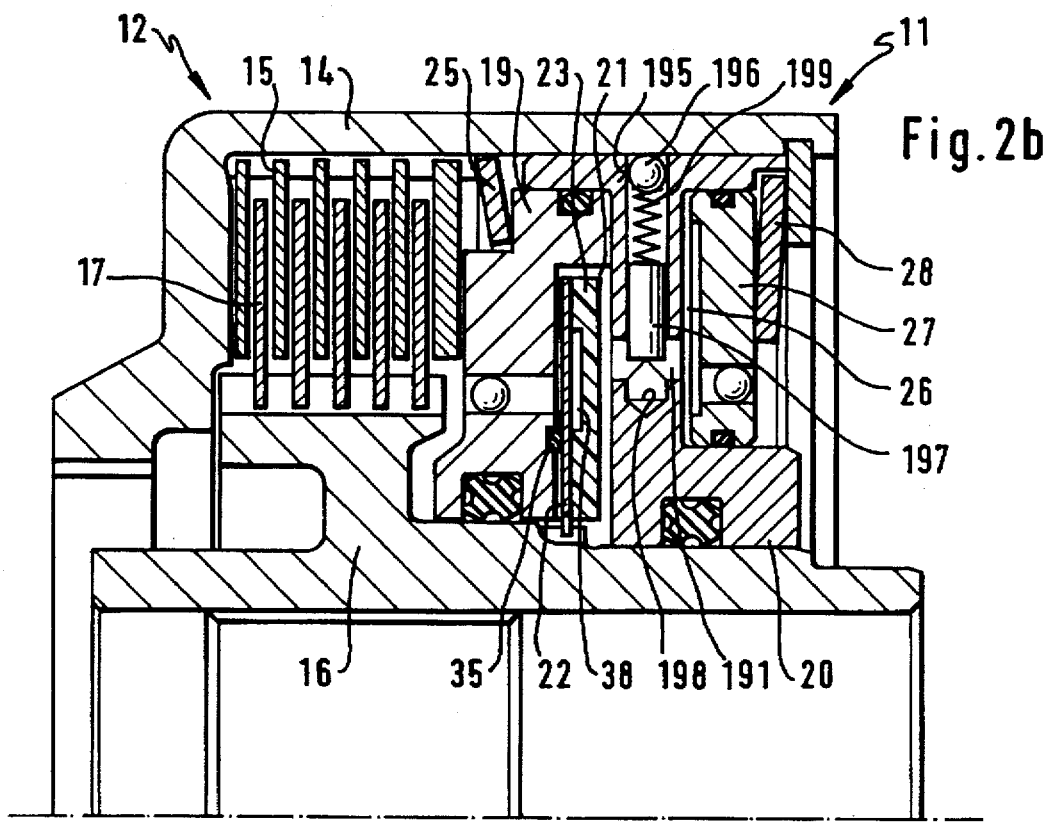
FIG. 2b is half a longitudinal section through a second embodiment of a coupling in accordance with the invention.

Any details in FIG. 2b corresponding to those of FIG. 2a have been given the same reference numbers. To that extent, reference is made to the description of FIG. 2a. A control aperture in the pumping and control member and an adjoining housing bore are not shown in section which is taken in a different circumferential position. Instead, there is shown a pipeline 191 having a radial bore 195 which extends transversely thereto and which is closed by a ball 196. The bore accommodates a valve body 197 which is loaded by a pressure spring 199, but which, in this case, is lifted off its valve seat 198 as a result of the pressure in the pressure chamber or under the influence of a centrifugal force.

Figure 2C:
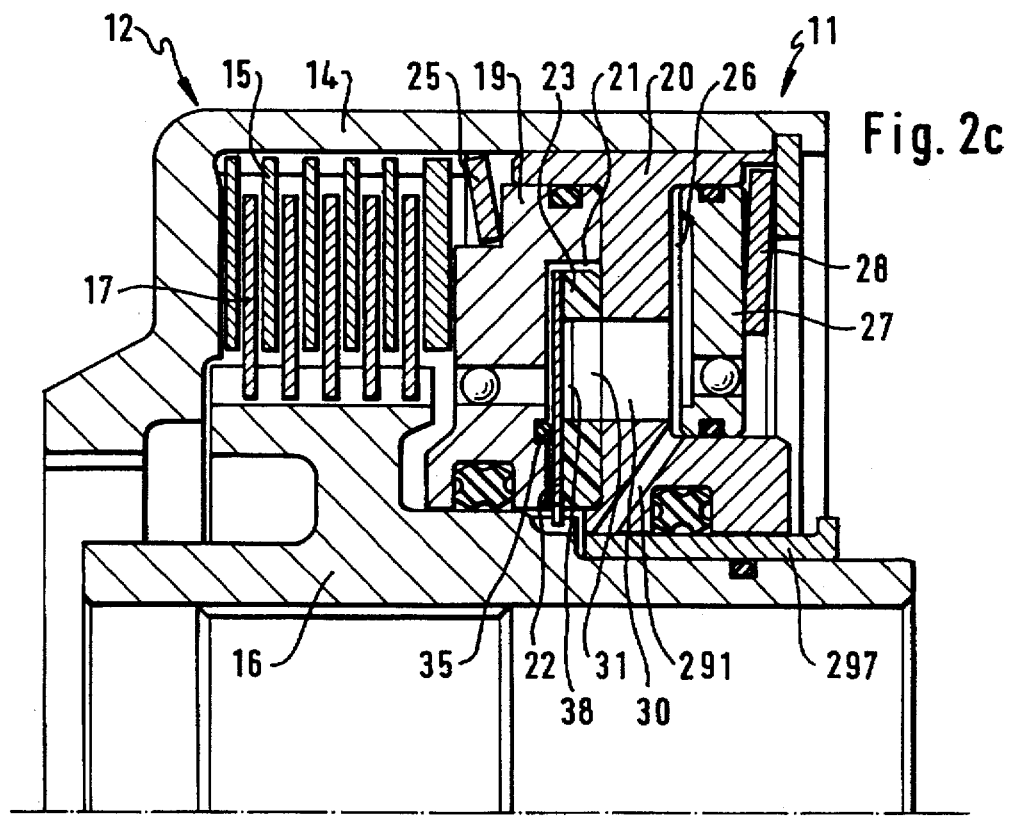
FIG. 2c is half a longitudinal section through a third embodiment of a coupling in accordance with the invention.

Any details in FIG. 2c corresponding to those of FIG. 2a have also been given the same reference numbers. To that extent, reference is made to the description of FIG. 2a. The section differs from that of FIG. 2b and is again taken in the same circumferential position as in FIG. 2a, in which it is possible to see a control aperture 31 in the pumping and a control member and the adjoining housing bore 30. Radially inside same, there is provided an inclined pipeline 291 which provides a connection between the pressure chamber 21 and the reservoir 26 and which is closed by a control member 297 in the form of a slide to be actuated from outside the coupling.

Figure 3B:
FIG. 3a and 3b show a plan view (a) and a longitudinal section (b) of the first embodiment of a pumping and control disc with a rotational housing in the form of details in a first position.

FIG. 3, in the form of details, shows a rotational housing 20 and a pumping and control member 23 in a plan view and axial section. The plan view shows the circumferentially extending groove 37 whose sides are delimited by walls 54, 55 and at whose ends there are arranged control apertures 31 and 33. The control aperture 33 also shown in section is positioned above the connecting channel 32 in the rotational housing. The control aperture 31 positioned at the other end overlaps with a radial connecting channel 43 in the rotational member, which is not shown in section. The position of a further through-aperture 30 in the rotational housing is indicated by dashed lines. The rotational stop 41 and the circumferentially delimited groove 42 arranged at the rear of the pumping and control member 23 and limiting the rotation of the pumping an control member 23 relative to the rotational housing 20 are indicated by dashed lines in the section and plan view.

Figure 4:
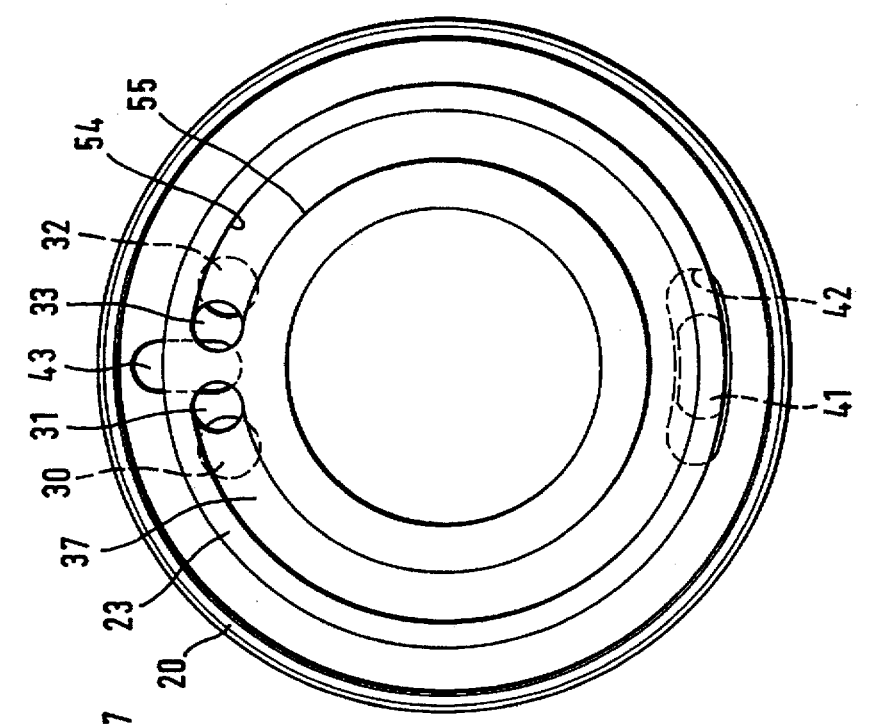
FIG. 4 is a plan view of the pumping and control disc and the rotational member according to FIG. 3 in a second position.

FIG. 4 shows the same details as FIG. 3, but in a plan view, and uses the same reference numbers. However, in this case, the rotational stop 41 is in a central position in the circumferentially delimited groove 42 between the two possible end positions. As a result, the control aperture 31 at the one end of the groove 37 where previously the pressure build-up took place is still connected to the connecting channel 43 leading to the pressure chamber, as well as the second control aperture 33 which previously, by means of the connecting channel 32, was connected to the reservoir and which has not yet lost its overlap with the connecting channel 32. In this way it is possible to achieve a direct pressure relief from the connecting channel 43 and thus from the pressure chamber to the connecting channel 33 and thus to the reservoir.

FIG. 5 shows the same details as FIGS. 3 and 4 in a plan view and in two sections, and uses the same reference numbers. However, the rotational stop 41 assumes the opposed end position in the circumferentially delimited groove 42. Now, the control aperture 31 overlaps with the second connecting aperture 30 leading to the reservoir, whereas the second control aperture 33 is connected to the connecting channel 43 leading to the pressure chamber. The pressure buildup now takes place at the end of the groove 37 at the control aperture 33. The position of the first connecting channel 32 leading to the reservoir and now being function-less is indicated by dashed lines in a plan view.

Figure 6C:
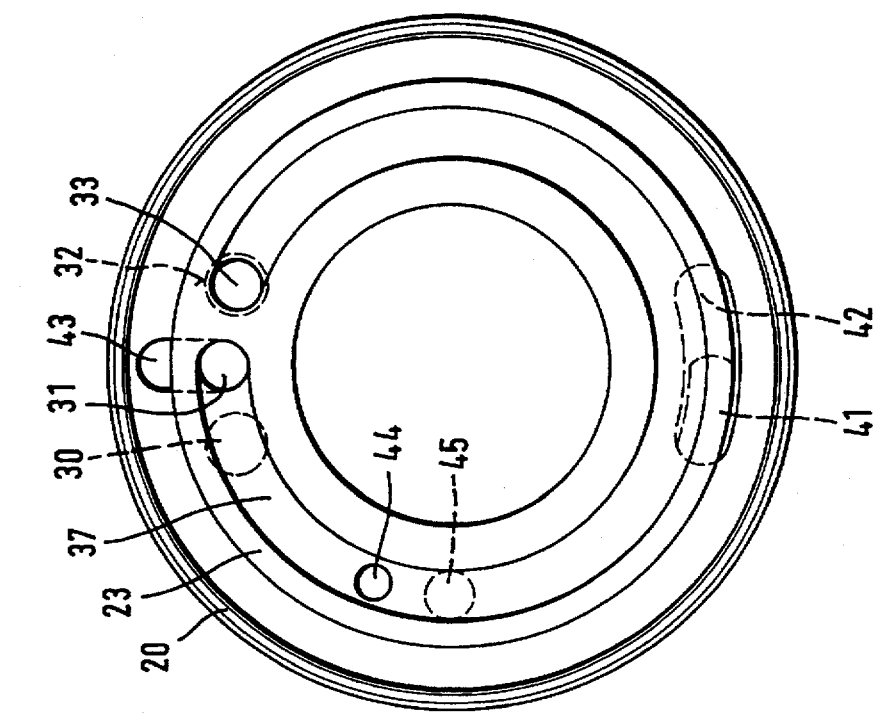
FIG. 6a, 6b, and 6c show a second embodiment of a pumping and control disc with a rotational member in a plan view in two positions (a, c) and in a longitudinal section (b) in the form of details.
Figure 6B:
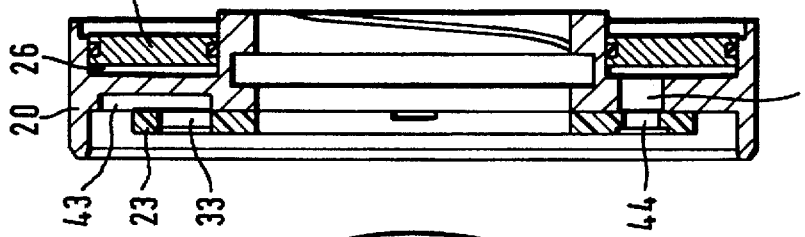
Figure 6A:
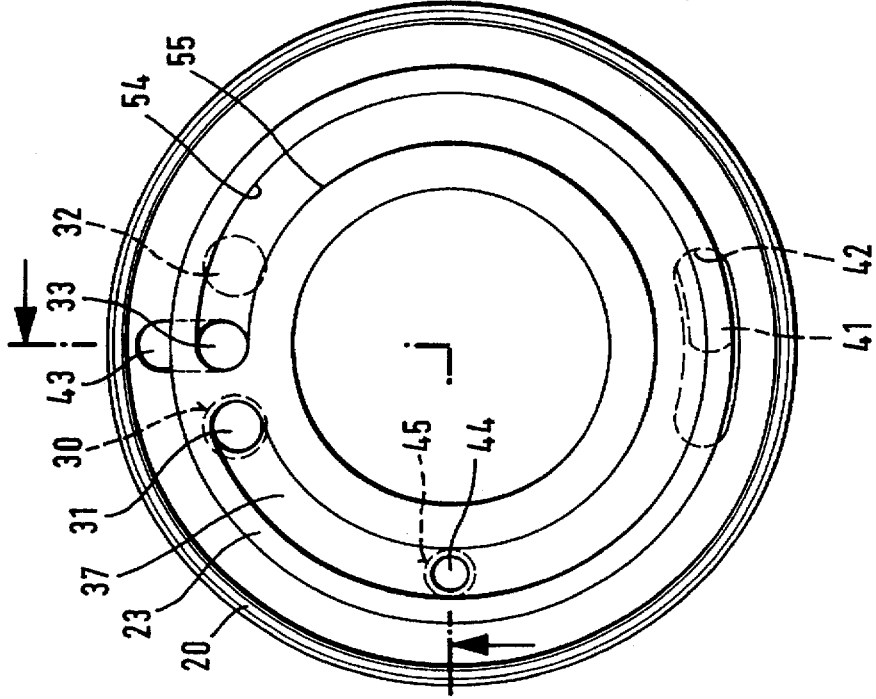

FIG. 6 shows a rotational member 22 and a pumping and control member 23 in an axial section and, again in an axial view, in two different positions, in an embodiment modified relative to FIGS. 3 to 5. To the extent that the details are identical, they have been given the same reference numbers. To that extent, reference is made to the previous description. In addition, the pumping and control member 23 comprises an additional control aperture 44 in the groove 37, which is positioned between the two control apertures 31 and 33. Furthermore, the rotational housing 20 comprises an additional connecting channel 45 which, in the position of the rotational stop 41 in the circumferentially delimited groove and thus in the position of the pumping and control member 23 relative to the rotational housing 20—which positions are illustrated in FIG. 6a and corresponds to those shown in FIG. 5a—overlaps with the control aperture 44. In this way, an effective pressure build-up does not take place over the entire length of the shear channel, but only in the angular region between the control aperture 44 and the control aperture 33, with a lower pressure existing at the connecting channel 43. In the opposite direction of relative rotation of the rotational member relative to the rotational housing, with the pumping and control member 23 and rotational housing 20 being in the position as illustrated in FIG. 6c, the control aperture 44 and the connecting channel 45 are offset relative to one another, so that the pressure builds up along the entire length of the shear channel from the control aperture 33 to the control aperture 31, thus leading to a higher pressure.

FIG. 7 shows a rotational member 22 and a pumping and control member 23 in an axial section and, in an axial view, in two different positions in an embodiment modified relative to FIGS. 3 to 5. To the extent that the details correspond to one another, they have been given the same reference numbers. To that extent reference is made to the previous description. In addition, the pumping and control member comprises an additional control aperture 46, while the rotational housing comprises an additional connecting channel 47.

Figure 3A:
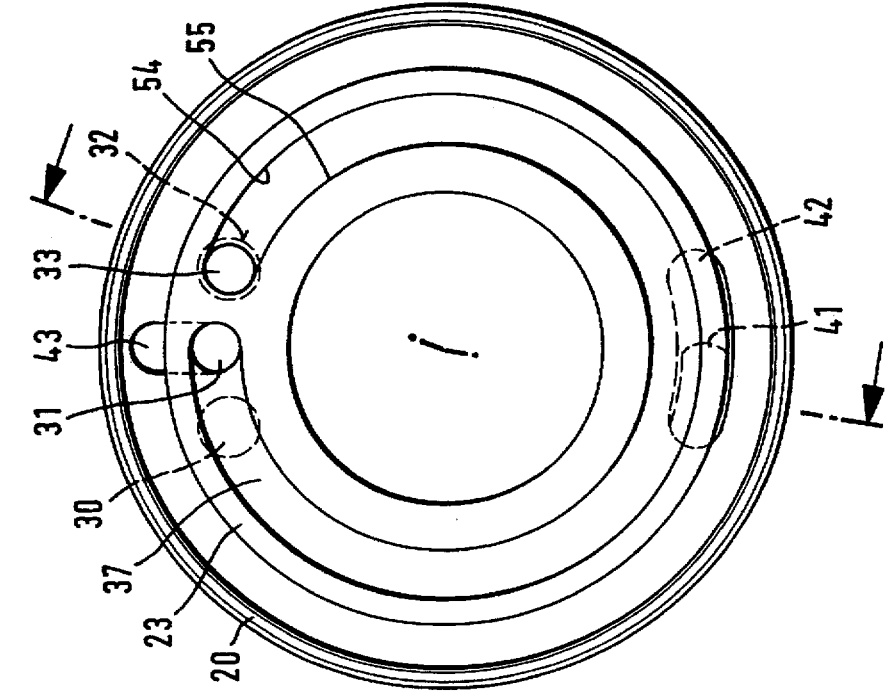

In the position of the rotational stop 41 in the circumferentially delimited groove 42 and thus in the position of the pumping and control member 23 relative to the rotational housing 20, which positions are shown in FIG. 7a and correspond to FIG. 5a, the control aperture 46 and the connecting channel 47 overlap. In this way, the pressure build-up in the shear channel takes place only in an angular region from the control aperture 31 connected by the connecting channel 30 to the reservoir, to the control aperture 46 and the connecting channel 47 which ends in the pressure chamber. The remaining part of the angular region from the control aperture 46 to the control aperture 33 overlapping with the connecting channel 43 is not effective. This means that in this direction of relative rotation between the rotational member and rotational housing, the pressure build-up is smaller than in the opposite direction of rotation which is illustrated in FIG. 7c and corresponds to a position of the control apertures leading to the connecting channel 43, as shown in FIG. 3a. In this case, the control aperture 46 and the connecting channel 47 are offset relative to one another and do not become effective, so that the pressure build-up takes place along the entire length of the shear channel from the control aperture 33 to the control aperture 31.

Figure 8A:
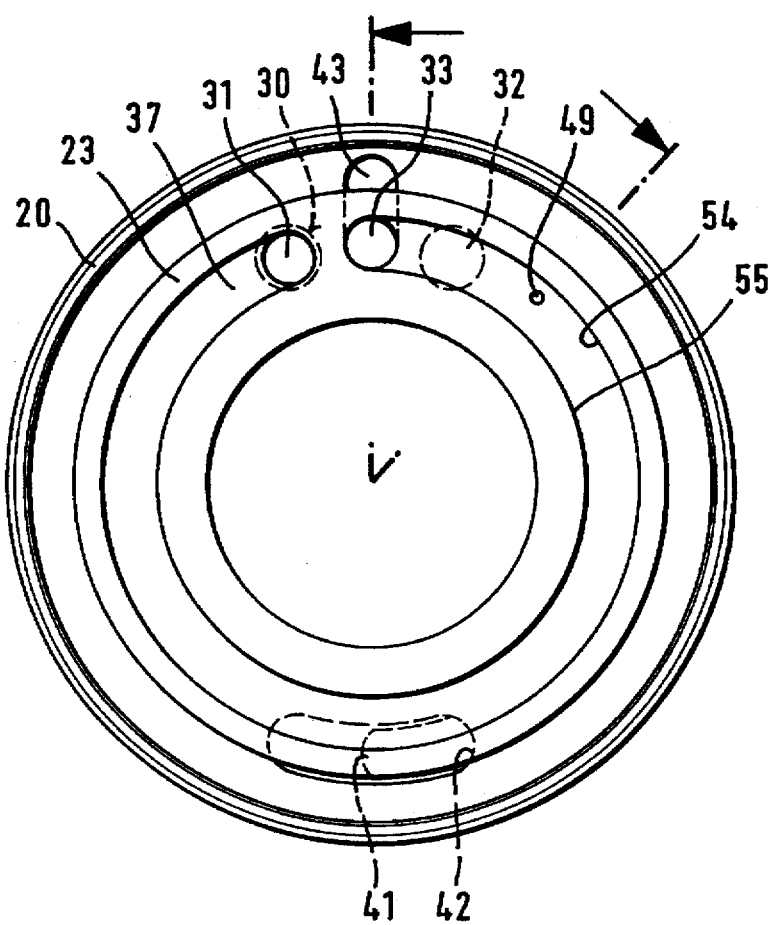
FIG. 8a and 8b show a fourth embodiment of a pumping and control disc with a rotational member in a plan view (a) and in a longitudinal section (b) in the form of details.
Figure 8B:
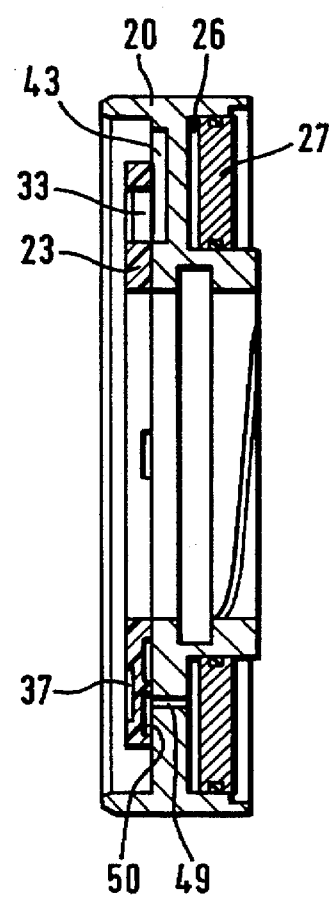

FIGS. 8a and 8b show a rotational housing 20, a pumping and control member 23 and a piston 27 which substantially correspond to those shown in FIGS. 5a and 5b. Identical details have been given identical reference numbers. To that extent, reference is made to the descriptions of FIGS. 3 to 5.

In addition, the rotational housing is provided with a throttling bore 49 which communicates with the reservoir 26. The contacting surface of the pumping and control member is provided with a recess 50 designed in such a way that, in one of the end positions of the rotational stop 41 relative to the circumferentially delimited groove 42, there becomes effective a connection between the pressure chamber and the reservoir, whereas in the second relative circumferential position, the throttling bore 49 is covered by the reverse side of the pumping and control member 23 thereby rendering it ineffective. In this way, a reduction in pressure in the pressure chamber is achieved in the one direction of relative rotation of the parts relative to one another. However, this is not the case in the other direction of relative rotation of the parts relative to one another, so that in this case, too, a different pressure build-up takes place as a function of the direction of rotation.

The illustration of the sections relative to plan views is contrary to standards.

FIGS. 9a and 9b, in the form of details, show a pumping and control member 23 of the type described above several times, with the control apertures 31, 33 and the groove 37 as well as the rotational stop being identifiable as details.

FIGS. 10a and 10b show the pumping and control member 23 according to FIG. 9 from the rear and in section. The also show a surface region 51 which accommodates the control apertures 31, 33 and which is designed in such a way that, depending on the position, it can rest sealingly on the connecting channels 30, 32, 43, 47. The surface region 51 is circumferentially delimited in such a way that, depending on the position, it can alternately open or close the throttling bore 49 described in connection with FIG. 8. The remaining surface, on the reverse side, comprises a plurality of annular ribs 53 to reduce the friction and adhesion relative to the housing. A surface 52 positioned opposite the surface 51 carries the rotational stop 41 whose height projects therebeyond.

The illustration of the sections relative to the plan views conforms to standards.

Figure 11A:
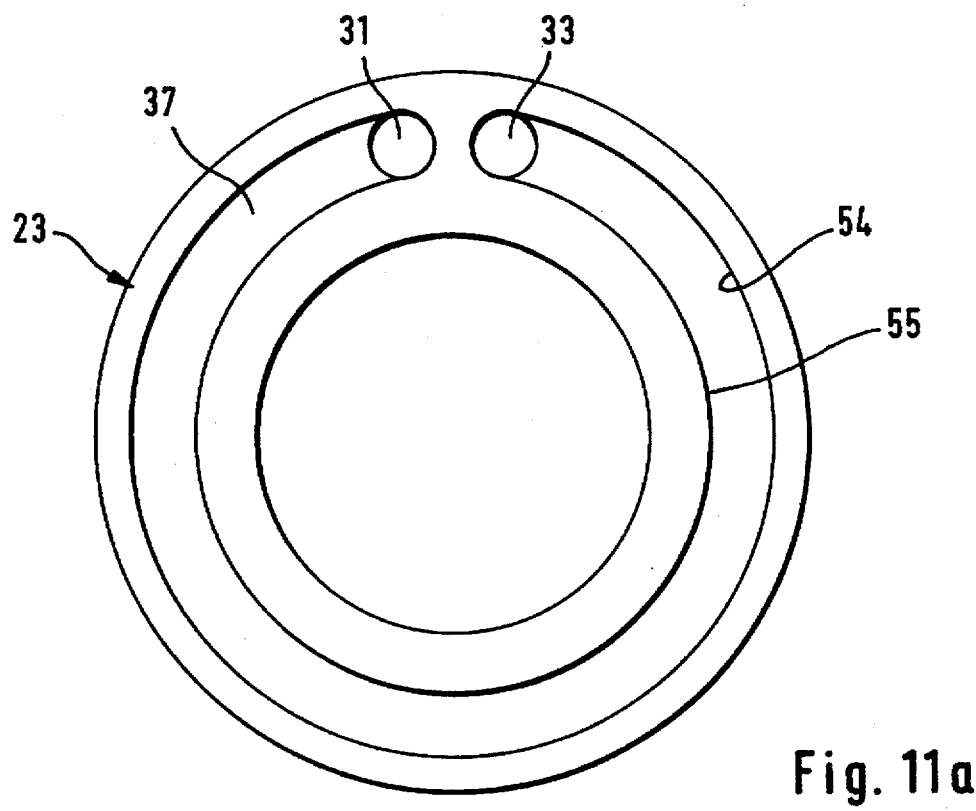
FIG. 11a is a plan view of the pumping and control disc according to FIG. 9b.
Figure 11B:
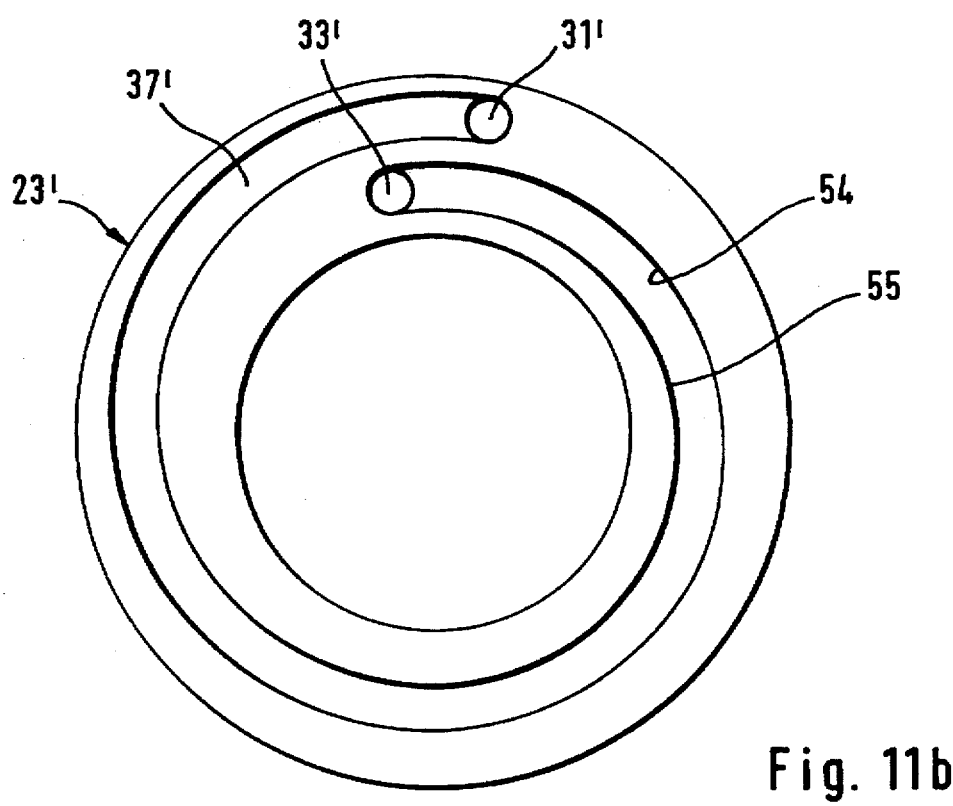
FIG. 11b shows a pumping and control disc with a modified form of the shear groove.

FIG. 11a, for comparative purposes, again shows a pumping and control member 23, the illustration of same corresponding to that of FIG. 9b. The groove 37 comprises a circumferential length of 360°−α, so that, when the pumping and control member 23 is rotated by α, the one control aperture 31 assumes the position previously held by the control aperture 32. FIG. 11b shows a groove 37b which comprises the circumferential length of 360°+α, with the groove being slightly spiral-shaped. Again, if the pumping and control member 23b is rotated by the angle α, the control aperture 31b assumes the angular position previously held by the control aperture 33b and vice versa.

Figure 12:
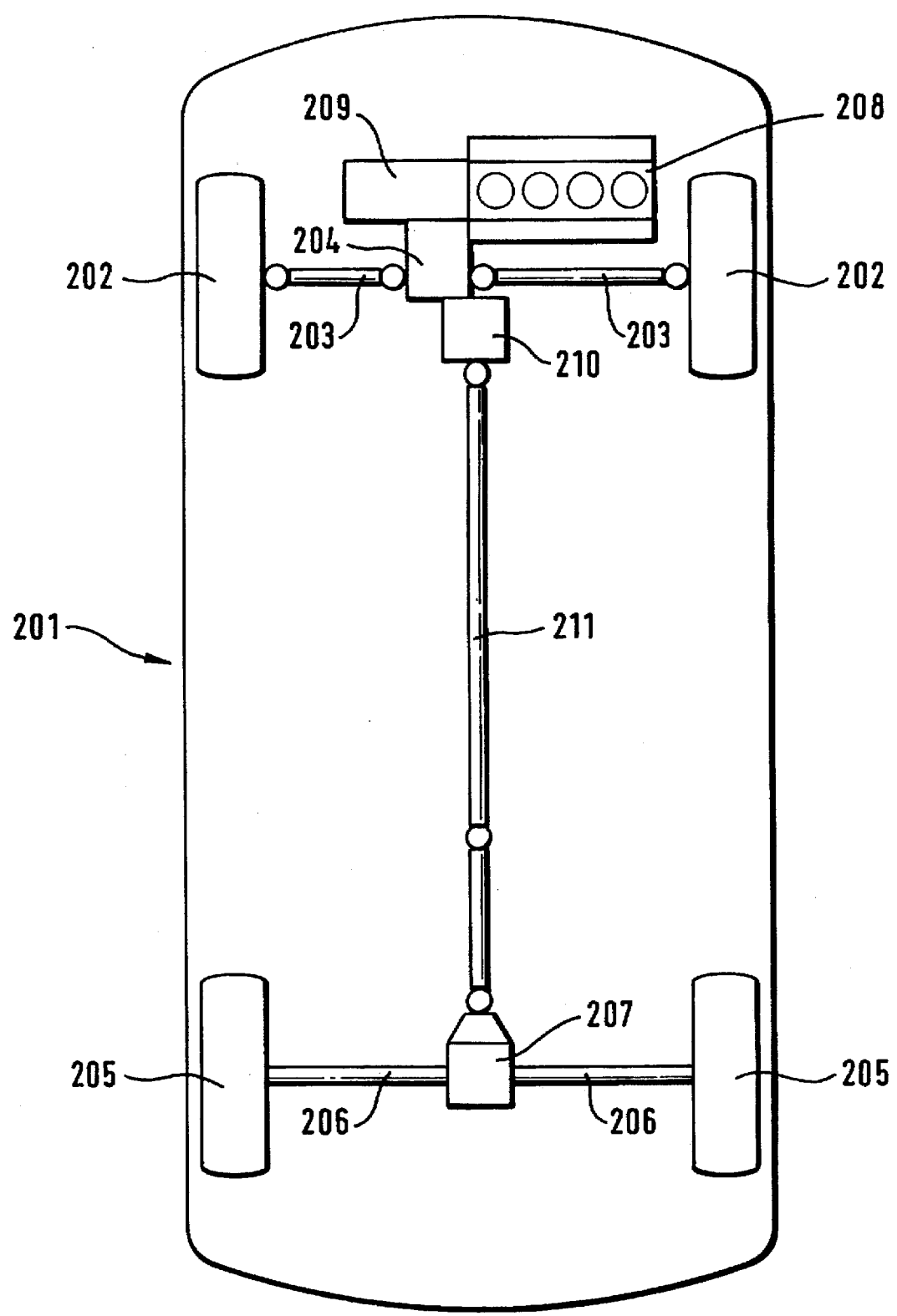
FIG. 12 shows a vehicle provided with a coupling in accordance with the invention.

FIG. 12 is a diagrammatic view of a motor vehicle 201 showing the following details: The vehicle comprises two front wheels 202 driven by the driving parts of a front axle 203 with an axle differential 204, and two rear wheels 205 driven by the driving parts of a rear axle 206 with an axle differential 207. Said vehicle further comprises an internal combustion engine 208 as a driving source which is transversely arranged in front and which is connected to a multi-step or continuously variable reduction gear 209 for adapting the speed range of the internal combustion engine to the speed range of the vehicle.

The output end of the reduction gear 209 is connected to both the input end of the axle differential 204 of the front axle 203 and, by means of a through-drive, to a coupling unit 210 in accordance with the invention, rotating therewith at the same speed, said coupling unit 210, via a propeller shaft 211, driving the input end of the differential 207 of the rear axle 206. The axle differentials 204, 207 distribute the introduced torque to the wheels of the respective axle shaft. The coupling 210 in accordance with the invention is fitted in such a way that one of the parts rotatable relative to one another is connected to the driving parts of the reduction gear 209 and the other one to the connecting pans of the propeller shaft 211.

What is claimed is:

1. A coupling for transmitting torque between two parts which are rotatable relative to one another, said coupling including;

a friction coupling having friction elements, whose friction elements are each non-rotatably connected to the one and the other of the parts which are rotatable relative to one another, with the friction coupling being loadable by at least one movable piston which, at one end, delimits a pressure chamber which is filled with a viscous fluid, which is connected to a reservoir, a rotational housing is formed by the one of the rotatable parts and by the piston sealed relative thereto and in which there rotates a rotational member connected to the other one of the rotatable parts;

wherein rotational faces of the rotational member, together with counter faces of a pumping and control member positioned in the pressure chamber, constitute at least one sealed shear channel which is formed by a groove laterally delimited by walls and extending circumferentially between two ends and by a surface which covers the groove and is rotatable relative thereto;

the pumping and control member is rotatable to a limited extent between two end positions relative to the rotational housing, that the groove, by means of control apertures, in the pumping and control member which are arranged at the groove ends, is connected to the reservoir in the rotational housing and to the pressure chamber between the piston and the rotational member is such a way that in the two end positions of the pumping and control member the control aperture arranged at the respective front end of the groove in a direction of relative rotation communicates with the reservoir and that the control aperture arranged at a respective rear end of the groove in the direction of relative rotation communicates with the pressure chamber; and a pipeline for connecting the pressure chamber to the reservoir, in which pipeline there is arranged a valve which opens from the pressure chamber to the reservoir and which is provided to limit the pressure in the pressure chamber.

2. A coupling according to claim 1, wherein the valve is a pressure relief valve which comprises a pretensioned spring and a valve body held thereby against a valve seat.

3. A coupling according to claim 2, wherein the valve body is arranged in the coupling so as to be movable in an axis-parallel way against a force of the spring, so that, upon rotation of the coupling, a centrifugal force acting on the valve body does not affect a contact force applied by the valve body to the valve seat.

4. A coupling according to claim 2, wherein the valve body is arranged in the coupling so as to be movable radially outwardly against a force of the spring, so that, upon rotation of the coupling, a centrifugal force acting on the valve body reduces a contact force applied by the valve body to the valve seat.

5. A coupling according to claim 2, wherein the valve rotates together with an input end of the coupling.

6. A coupling according to claim 2, wherein at an increased speed, the valve opens the pipeline, independently of a prepressure in the pressure chamber.

7. A coupling according to claim 1, wherein the valve is a valve which is controllable from outside the coupling and which comprises a valve body which is suitable for, optionally, being lifted off its valve seat.

8. A coupling according to claim 7, wherein the valve body is a slide which is adjustable in the coupling in an axis-parallel way.

9. A coupling according to claim 1, wherein for the purpose of achieving characteristics which are asymmetric as a function of the direction of rotation, there is provided an additional control aperture in the pumping and control member, by means of which a central portion of the shear channel communicates with the reservoir in only one of the two end positions.

10. A coupling according to claim 9, wherein the further control aperture is provided in the form of an axial bore in the disc-like pumping and control member, which axial bore ends in a central region of the groove and which, in only one of the end positions, overlaps with the additional connecting channel leading to the reservoir.

11. A coupling according to claim 1, wherein for the purpose of achieving characteristics which are asymmetric as a function of the direction of rotation, there is provided an additional control aperture in the pumping and control member, by means of which a central portion of the shear channel communicates with the pressure chamber in only one of the two end positions.

12. A coupling according to claim 11, wherein the further control aperture is provided in the form of an axial bore in the disc-like pumping and control member, which axial bore ends in a central region of the groove and which, in only one of the end positions, overlaps with an additional radial connecting channel leading to the pressure chamber, which channel is provided in a form of a radial groove in an end wall of the rotational housing.

13. A coupling according to claim 1, wherein there are provided spring means for axially pressing the rotational member and the pumping and control member against one another.

14. A coupling according to claim 1, wherein at least one shear channel is formed by a groove in only one of the rotational faces of the pumping and control member and by a counter face, resting thereagainst, of the rotational member rotatable relative thereto.

15. A coupling according to claim 1, wherein the control apertures at the ends of the groove are provided in the form of axial bores in the disc-like pumping and control member, which extend from the one end face which, at least in the region of the apertures, sealingly rests against an end wall in the rotational housing, with connecting channels leading to the reservoir ending in said end wall, to the groove positioned in the opposed second end face, that said second end face sealingly rests against an end face of the rotational member, and that, in each end position, only one of the control apertures overlaps with a connecting channel.

16. A coupling according to claim 1, wherein a connecting channel leading to the pressure chamber is provided in a form of a radial groove in an end wall of the rotational housing, which radial groove, in each of the two end positions, overlaps with one of the two control apertures at the ends of the groove.

17. A device according to claim 1, wherein a rotational stop at the pumping and control member engages a groove in the rotational housing, whose circumferential length is limited.

18. A coupling according to claim 1, wherein there are provided spring means which are supported on the housing and load the piston with a counter force relative to a pressure in the pressure chamber.

19. A coupling according to claim 1, wherein there are provided spring means which are supported on the housing and support the piston by means of an additional force relative to a pressure in the pressure chamber.

20. A coupling according to claim 1, wherein there are provided spring means which, in a pretensioned condition, are arranged between the piston and the friction coupling and permanently load same with a minimum force.

21. A coupling according to claim 1, wherein the reservoir is formed by the rotational housing and by a piston which rotates with the housing and which is axially movable to a limited extent and spring-loaded towards a minimum volume.

22. A motor vehicle having a permanently driven axle and an axle driven from case to case, comprising a differential-speed-dependent coupling in its driveline leading to the axle driven from case to case wherein, said coupling is designed as a coupling for transmitting torque between two parts which are rotatable relative to one another, said coupling including, a friction coupling having friction elements, whose friction elements are each non-rotatably connected to the one and the other of the parts which are rotatable relative to one another, with the friction coupling being loadable by at least one movable piston which, at one end, delimits a pressure chamber which is filled with a viscous fluid, which is connected to a reservoir, a rotational housing is formed by the one of the rotatable parts and by the piston sealed relative thereto and in which there rotates a rotational member connected to the other one of the rotatable parts;

wherein rotational faces of the rotational member, together with counter faces of a pumping and control member positioned in the pressure chamber, constitute at least one sealed shear channel which is formed by a groove laterally delimited by walls and extending circumferentially between two ends and by a surface which covers the groove and is rotatable relative thereto;

the pumping and control member is rotatable to a limited extent between two end positions relative to the rotational housing, that the groove, by means of control apertures, in the pumping and control member which are arranged at the groove ends, is connected to the reservoir in the rotational housing and to the pressure chamber between the piston and the rotational member in such a way that in the two end positions of the pumping and control member the control aperture arranged at the respective front end of the groove in a direction of relative rotation communicates with the reservoir and that the control aperture arranged at a respective rear end of the groove in the direction of relative rotation communicates with the pressure chamber; and a pipeline for connecting the pressure chamber to the reservoir, in which pipeline there is arranged a valve which opens from the pressure chamber to the reservoir and which is provided to limit the pressure in the pressure chamber.

\* \* \* \* \*

UNITED STATES PATENT AND TRADEMARK OFFICE
CERTIFICATE OF CORRECTION

PATENT NO. : 5,690,201
DATED : November 25, 1997
INVENTOR(S) : THEODOR GASSMANN

It is certified that error appears in the above-identified patent and that said Letters Patent is hereby corrected as shown below:

Column 1, line 65, delete "pan", and insert therefore, --part--.
Column 4, line 19, delete "pan", and insert therefore, --part--.
Column 4, line 35, delete "pans", and insert therefore, --parts--.
Column 5, line 36, delete "ramble", and insert therefore, --rotable--.
Column 9, line 20, delete "an", and insert therefore, --and--.
Column 9, line 50, delete "member 22", and insert therefore, --housing 20--.
Column 10, line 11, delete "member 22", and insert therefore, --housing 20--.
Column 11, line 6, delete second occurrence "The", and insert therefore, --They--.
Column 11, line 27, delete "37b", and insert therefore, -- 37'--.
Column 11, line 30, delete "23b", and insert therefore, --23'--.
Column 11, line 31, delete "31b", and insert therefore, --31'--.
Column 11, line 32, delete "33b", and insert therefore, --33'--.

Signed and Sealed this

Twenty-first Day of December, 1999

Attest:

Q. TODD DICKINSON

*Attesting Officer*     *Acting Commissioner of Patents and Trademarks*